Aug. 27, 1968 C. M. HANSEN ET AL 3,398,542
SUBTERRANEAN PLOW
Filed Aug. 30, 1966 2 Sheets-Sheet 1

INVENTORS.
Clarence M. Hansen
Louis E. Ott

ATTORNEY

INVENTORS.
Clarence M. Hansen
Louis E. Ott
ATTORNEY

United States Patent Office 3,398,542
Patented Aug. 27, 1968

3,398,542
SUBTERRANEAN PLOW
Clarence M. Hansen, East Lansing, Mich., and Louis E. Ott, St. John, Ind.; said Hansen assignor to Board of Trustees, a constitutional corporation operating Michigan State University of Agriculture and applied Science, and said Ott assignor to Standard Oil Company, Chicago, Ill., a corporation of Indiana
Filed Aug. 30, 1966, Ser. No. 576,015
4 Claims. (Cl. 61—72.2)

ABSTRACT OF THE DISCLOSURE

A subterranean plow has an upright support for attachment to a power source and for being moved through the earth. A plow share depending from the support has a laterally extending leading arcuate cutting edge terminating in a bottom earth planing portion. Lateral planing side portions are provided to move the earth aside and an upper rearwardly extending portion to create a cavity in the earth under the plow share. Liquid distributing nozzles are disposed beneath the rearwardly extending portion to discharge fluid against the exposed earth of the cavity and which fluid will define an impervious membrane covered with earth as the plow share moves forwardly.

---

This invention relates to subterranean apparatus suitable for use in the in situ formation of subterranean asphaltic water barriers in preselected strata of soil to control water migration therein.

Large areas of land are located in arid and semi-arid areas of the world where, due to the porosity of the soil, insufficient water is retained in the plant root zone to make such land suitable for agricultural or grazing purposes. As the population of the world continues to grow, need for using this marginal land for agricultural purposes becomes more pressing. Formerly, it was believed that this type of marginal land could not compete with the more fertile land, thus such marginal property was unsuitable for agricultural purposes. In many areas, good agricultural land is becoming sufficiently scarce so as to create a need for economical and easily applied methods for reclaiming sandy and other porous soils which lack sufficient water retention properties for agricultural purposes.

The upward migration of subsurface moisture is an ever present problem in many soils. For example, such moisture is extremely damaging to roads in temperate zones where alternate freezing and thawing produces frost boils and subsequent road destruction. This problem is especially acute in plastic or clayey soils where adequate drainage cannot be effected.

Prior to the present invention, suitable apparatus was not available for producing satisfactory underground water barriers in situ in soils. Briefly, such barriers are formed by creating an artificial translating cavity having unsupported side and bottom soil surfaces at a desired depth in the soil, an asphaltic material, such as an asphalt emulsion, is then introduced, the emulsion broken whereby a continuous layer of asphalt is formed on the exposed soil surfaces in the cavity, and then the cavity is closed embedding the asphalt in the soil.

The apparatus of the present invention is illustrated in the accompanying drawings wherein like parts are identified by same numerals:

Figure 1:
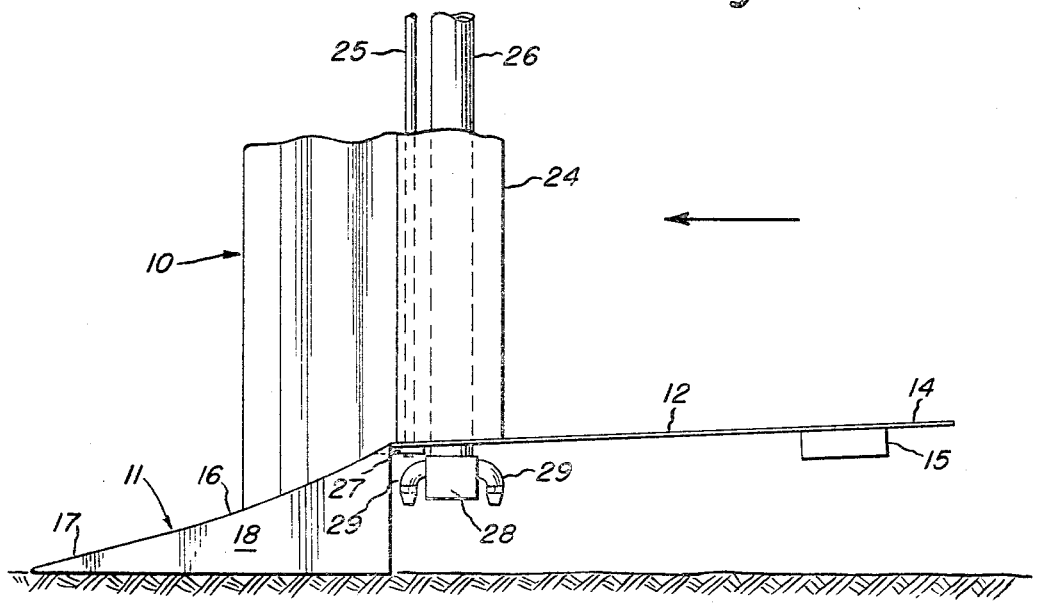
FIG. 1 is a side elevation of the plow in contact with ground surface.
Figure 2:
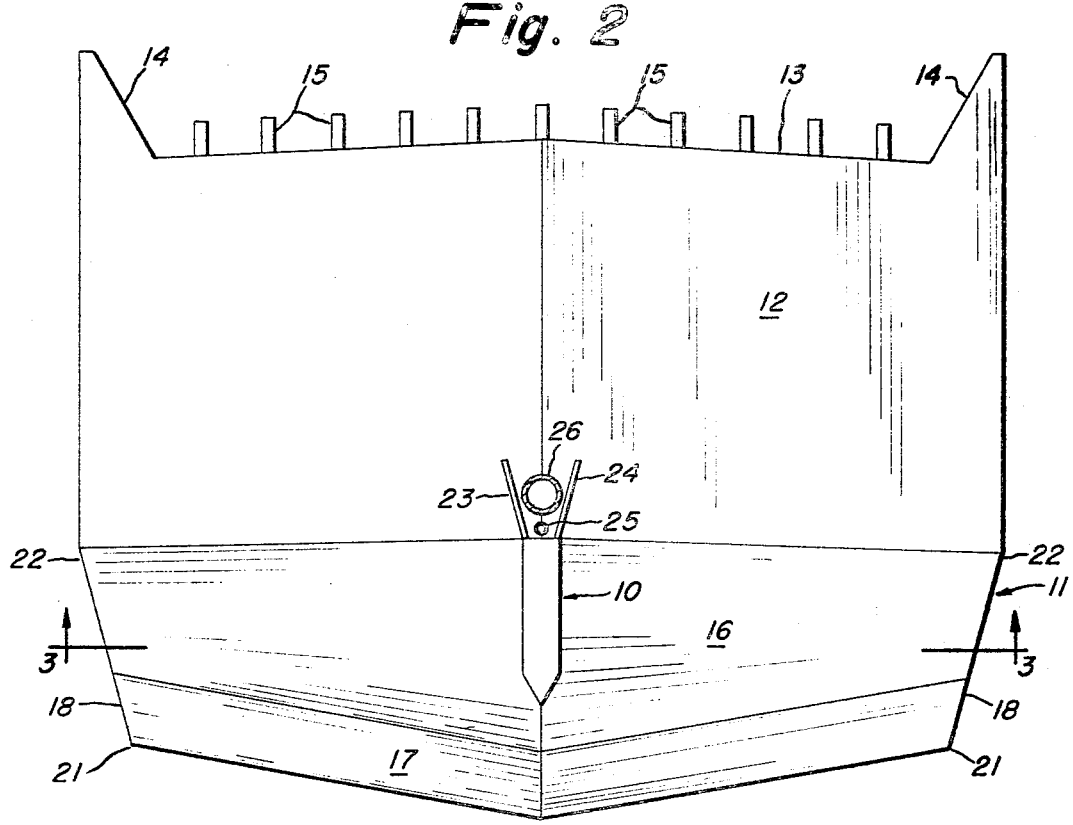
FIG. 2 is a plan view of the apparatus.
Figure 3:
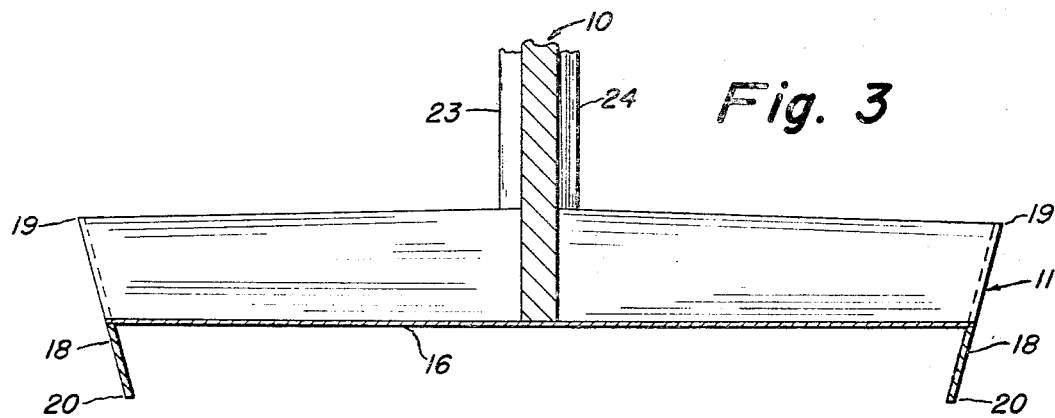
FIG. 3 is an end elevational view taken along lines 3—3 of FIG. 2.

Referring now to FIGS. 1–3, the plow comprises a vertical support member 10, which is provided with means, not shown, at its upper end for attachment to power means, not shown, for raising and lowering the plow assembly into and out of the ground as well as for pulling the assembly through the ground at a preselected depth. Attached at the lower end of vertical member 10 is a plow share member 11 having a rearwardly extending flat portion 12 terminating in a trailing edge 13 flaring outwardly to form angular portions 14. Affixed to the trailing edge 13 are rake members 15. Plow share member 11 is provided with a forwardly extending portion 16 which is inclined downwardly to terminate in shoe 17 having a horizontal arcuate cutting edge and a bottom planing portion. Shoe 17 is provided at its outer edges with planing portions 18 which have a compound taper so that the top edge 19 extends outwardly about 15° of its bottom edge 20 and the front side edge thereof 21 is inward about 15° of its trailing edge 22, as shown in FIGS. 2 and 3.

Vertical support member 10 has flaring portions 23 and 24 to provide a protective sheath for fluid conduits 25 and 26. Conduit 25, for introducing gaseous fluid, such as ammonia, into the open space below share 11, terminates in apertured distributing means 27. Conduit 26, for introducing liquid, such as aqueous asphalt emulsion, also into the space below share 11, terminates in a distributor 28 provided with one or more spray nozzles 29.

Figure 4:
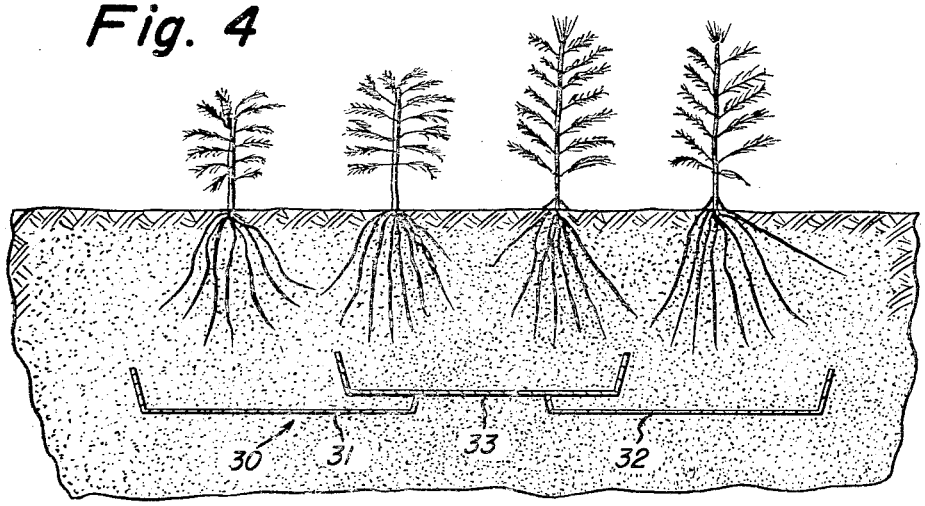
FIG. 4 illustrates a completed underground asphaltic water barrier formed with the apparatus of this invention.

In operation, plow assembly attached to a suitable pulling source, such as a tractor, is lowered into the ground and pulled therethrough in the direction of the arrow. As the plow proceeds through the ground, the ground is raised and supported by flat portion 12 thereby forming a translating cavity having unsupported and exposed soil surface walls and bottom in the area under portion 12. Concurrently, gaseous fluid, such as anhydrous ammonia, is introduced through conduit 25 to establish a gaseous atmosphere in the cavity; and liquid asphaltic material, such as an aqueous cationic asphalt emulsion, is introduced into the cavity through conduit 26, distributor 28 and spray nozzles 29. The asphalt emulsion spray is broken and a continuous layer of asphalt is formed on the exposed soil surfaces of the cavity prior to closing of the cavity by the soil dropping off the trailing edge 13 and extensions 14. Planing portion 18 of shoe 17 form the compacted side walls of the cavity so that loose soil will not disturb the asphalt layer thereon before the cavity closes and also to provide a base to form outwardly extending upstanding walls of the asphalt barrier. This is more clearly shown in FIG. 4 which illustrates a continuous underground asphalt barrier 30 formed by three separate passes of the plow through the soil. The barrier 30 comprises two asphalt troughs 31 and 32 at one elevation interconnected by trough 33 at a higher elevation wherein the bottom of trough 33 is sealed to the adjacent upstanding walls of troughs 31 and 32.

Continuous barriers of any width can be formed by repetitive passes of the plow through the subsurface soil at the different elevations whereby the plurality of parallel asphalt troughs are interconnected in the manner described.

It will be readily apparent to those skilled in the art that the apparatus of this invention can be used to form monolithic subterranean asphalt water barriers in situ to control the upward and downward migration of water in soils. It is particularly suitable for forming effective subsurface water barriers in droughty or porous soils to control water loss by percolation, and in roads built over plastic subgrades having a constant moisture content and thereby prevent upward intrusion of water through capillarity into the road bed.

We claim:
1. A subterranean plow suitable for forming in situ subterranean asphalt water barriers in soils comprising the combination of:
   (A) vertical support means provided at the upper end thereof with means for attaching to power means for moving said plow through soil;
   (B) plow share means attached at the lower end of said vertical support means, said share means comprising:
      (I) a body portion having
         (a) a substantially horizontal rearwardly extending portion having laterally spaced free terminal side edges and
         (b) a forwardly extending portion slantingly depending from the front portion of said rearwardly extending portion, said forwardly extending portion terminating in a lateral horizontal arcuate cutting edge and a lateral bottom planing portion and being provided at each of its lateral side extremities with a depending upright planing portion being connected to the lateral extremity of said cutting edge, each of said upright planing portions having a compound taper so that its top edge extends outwardly about 15° of its bottom edge and its front edge extends inwardly about 15° of its trailing edge, and
      (II) liquid distributing means positioned below said rearwardly extending portion; and
   (C) conduit means for introducing liquid to said liquid distributing means.

2. The plow of claim 1 wherein said liquid distributing means comprises a horizontal manifold provided with a plurality of spray nozzles.

3. The plow of claim 1 wherein the outer ends of the trailing edge of the rearwardly extending portion are angularly extended to the side edges of said portion.

4. The plow of claim 1 further including gaseous fluid distributing means positioned below said rearwardly extending portion, and conduit means for introducing gaseous fluid to said gaseous fluid distributing means.

References Cited

UNITED STATES PATENTS

| | | | |
|---|---|---|---|
| 291,313 | 1/1884 | Eaton | 61—72.2 |
| 668,362 | 2/1901 | Tomlinson | 61—13 |
| 1,006,116 | 10/1911 | Morse | 61—72.6 X |
| 1,398,815 | 10/1921 | Trusty et al. | 61—72.2 |
| 2,680,416 | 6/1954 | Russell | 61—72.2 |
| 3,276,208 | 10/1966 | Bolt | 61—1 |

EARL J. WITMER, *Primary Examiner.*